United States Patent [19]

Takenaka Masaaki et al.

[11] 4,365,091

[45] Dec. 21, 1982

[54] METHOD FOR THE PRODUCTION OF ACRYLAMIDE

[75] Inventors: Takenaka Masaaki, Chiba; Tsutomu Takahashi, Ichihara; Tatuya Momobayashi, Chiba, all of Japan

[73] Assignee: Sumitomo Chemical Company, Limited, Osaka, Japan

[21] Appl. No.: 317,335

[22] Filed: Nov. 2, 1981

[30] Foreign Application Priority Data

Nov. 6, 1980 [JP] Japan ............... 55-156793
Nov. 6, 1980 [JP] Japan ............... 55-156794

[51] Int. Cl.$^3$ ............................... C07C 102/08
[52] U.S. Cl. .................... 564/127; 252/462; 252/473; 252/474; 252/475; 252/476; 564/128
[58] Field of Search ............... 564/127, 128; 252/462, 252/473, 474

[56] References Cited

U.S. PATENT DOCUMENTS

| | | | |
|---|---|---|---|
| 3,696,152 | 10/1972 | Habermann et al. | 564/127 |
| 3,957,606 | 12/1976 | Karne | 564/127 |
| 4,176,137 | 11/1979 | Platz et al. | 564/127 |
| 4,177,210 | 12/1979 | Vanderkooi et al. | 564/127 X |

*Primary Examiner*—Robert V. Hines
*Attorney, Agent, or Firm*—Stevens, Davis, Miller & Moshher

[57] ABSTRACT

A method for the production of acrylamide by a catalytic hydration of acrylonitrile characterized by using a compound oxide catalyst which is prepared by a precipitation process and represented by the formula, $$Ti_a X_b Y_c O_d$$

wherein Ti is titanium, X is one of zinc, cadmium and copper, Y is either nickel or lanthanum and the atomic ratios a, b and c are 15 to 98, 2 to 85 and 0 to 20, respectively and d is the number of oxygen atoms satisfying the valence of the other elements.

5 Claims, No Drawings

METHOD FOR THE PRODUCTION OF ACRYLAMIDE

This invention relates to a method for the production of acrylamide by a catalytic hydration of acrylonitrile using a compound oxide catalyst consisting of specified components.

The catalytic hydration reaction between nitrile and water using metallic copper as a catalyst is well known. The defect of metallic copper catalyst is the shortness of its life-time, and accordingly, the gradual decrease of hydrating activity is unavoidable. Further, its activity is very unstable, so that much care is necessary for the storage and handling of the catalyst.

On the other hand, the use of manganese dioxide ($MnO_2$) as a catalyst for the catalytic hydration of nitriles is proposed in U.S. Pat. No. 3,366,639. Although the manganese dioxide is relatively high in activity and selectivity, its life-time is short and it has the defect of forming a polymer.

As the result of various studies, the present inventors discovered a novel catalyst for producing acrylamide by the hydration of acrylonitrile. This is, a compound oxide catalyst comprising titanium, as well as zinc, cadmium, copper or a combination thereof as a second component and, if necessary, nickel, lanthanum or a combination thereof as a third component. As the second component, zinc is preferable. The hydration reaction is preferably carried out in liquid phase. The activity of the catalyst varies also depending on the method of its preparation, and a catalyst prepared by the homogeneous precipitation process using urea exhibits good activity and selectivity. This catalyst is easy to store and handle, exhibits excellent activity and selectivity, and has a long life-time.

Acrylamide is well known as a starting monomer for polyacrylamide having many uses such as flocculants, additives for papers, mobility control agents in water flooding for tertiary oil recovery, and the like, so that it is a compound quite useful industrially.

Hitherto, acrylamide has been produced by reacting acrylonitrile, water and sulfuric acid to obtain acrylamide sulfate and then neutralizing the latter with alkali. Lately, however, a process for the direct production of aqueous acrylamide solution by the catalytic hydration of acrylonitrile in the presence of metallic copper catalyst was developed.

A metallic copper-containing catalyst is usually oxidized by the small quantity of oxygen dissolved in the liquid reaction mixture and is converted to copper oxide. Thus, its activity and selectivity decrease gradually.

Since the catalyst in this invention is an oxide, it does not undergo deactivation owing to the dissolved oxygen. Further, unlike manganese dioxide, it does not form a polymer, but it retains good activity and selectivity over a long period of time.

According to the process of this invention, the hydration reaction of nitrile is carried out by the use of the above-mentioned catalyst usually at a temperature ranging from room temperature to 300° C. From the viewpoint of increasing the reaction rate and suppressing side reactions, it is particularly preferable to carry out the reaction at a temperature of 40° C. to 150° C.

In the hydration reaction of nitrile, it is necessary that at least a stoichiometric quantity of water, based on the nitrile, exists in the reaction system. This water may be free water, or it may also be a hydrating water when the compound oxide catalyst is at least partially hydrated.

Although the reaction can be carried out in gas phase or liquid phase, it is usually carried out in liquid phase. It is also possible to carry out the above-mentioned reaction under increased pressure.

The reaction can be carried out by means of any of fixed-bed and suspension methods.

In order to suppress polymerization in the course of reaction, an appropriate polymerization inhibitor such as hydroquinone, phenothiazine, p-tertbutylcatechol or the like may be added, if necessary. It is also possible to suppress the polymerization by allowing the dissolved oxygen to exist in the liquid to be fed into the reaction system.

In the catalytic hydration reaction of acrylonitrile, there is a possibility that undesirable by-products such as ethylene cyanohydrin, $\beta$-hydroxypropionamide and the like will be formed by the addition reaction of water to carbon-carbon double bond. The catalyst used in the method of this invention has the desirable property whereby the formation of the above-mentioned side reaction products is little and the formation of polymer is not accelerated.

The catalyst used in the method of this invention is a compound oxide catalyst of the formula:

$$Ti_aX_bY_cO_d$$

wherein Ti is titanium, X is one of zinc, cadmium and copper, Y is either nickel or lanthanum and atomic ratios a, b and c are 15 to 98, 2 to 85 and 0 to 20, respectively and d is the number of oxygen atoms satisfying the valence of the other elements.

Generally, the catalyst activity and selectivity vary along with the atomic ratios of the components of the catalyst. The activity of the catalyst is rather low, when either of the atomic ratios of Ti and Y is much lower than that of the other. But, it increases according to the increase of the lower atomic ratio and reaches a maximum at the almost equi-atomic ratio. Accordingly, the preferable atomic ratios between them is the case where a is 30 to 70 and b is 70 to 30. Besides, zinc is the best as the second component. The catalyst activity is improved with the addition of the third component, namely, nickel or lanthanum, if the atomic ratio of the second component is fairly less than that of titanium, especially not more than 30% of the atomic sum of titanium and the second component.

The term "compound oxide" in this invention includes binary oxide, ternary oxide, quaternary oxide, higher multi-component oxide, solid solution and non-stoichiometric oxide. It also includes a physical mixture of single oxides, such as a mixture of titanium dioxide and zinc oxide, or the like. As defined herein the term "oxide" includes hydrated oxide and hydroxide which are in a hydrated state.

The compound oxide catalyst used in this invention can be prepared by any method adoptable in the preparation of this sort of catalyst. As the process for its preparation, the precipitation process using an alkaline substance or urea can be employed preferably. According to the most frequently employed process, by the precipitation process comprising adding a solution, particularly aqueous solution, of ammonia water, alkali hydroxide, alkali carbonate, organic amine or the like as an alkaline substance to a solution, particularly aqueous solution, of salts such as sulfate, nitrate, oxygen acid salt, hydrogen halide salt, organic acid salt or the like of two or more metals specified above, or the so-called homogeneous precipitation process comprising heating said metallic salt solution with stirring in the presence of urea, a precipitate of the corresponding metal hydroxide or hydrated oxide is formed, and the resulting precipitate is calcined at an appropriate temperature. Said homo-geneous precipitation process is a particularly preferable precipitation process.

It is also possible to stepwise carry out the unification of plural metallic compounds. For example, it is possible to precipitate a hydroxide or a hydrated oxide by first preparing an oxide and then, in its presence, adding an alkali to aqueous solution of the other metallic salt. As a process not passing through the precipitate of hydroxide or hydrated oxide, there can be employed a process which comprises heating and thermally decomposing a single one of the above-mentioned salts or a mechanical mixture of two or more members of the above-mentioned salts at a temperature high enough to form oxide(s) and thereby obtaining the corresponding oxide. A mechanical-chemical process which comprises mixing together beforehand prepared oxides and then thoroughly pulverizing the mixture by means of a ball mill or the like can also be employed. In such a case, it is more effective to carry out the ball mill treatment in a wet state by adding water.

The compound oxide catalyst thus obtained is preferably heat-treated for the purpose of stabilizing the catalyst structure.

In the latter case, the temperature of the treatment may be selected appropriately in accordance with the kind of metal used or the combination of metals used. Usually, the temperature of the treatment is preferably in the range of 100° C. to 600° C. As to the atmosphere of heating, it is generally recommended to avoid the use of a reductive atmosphere. Such a compound oxide catalyst can be used by supporting it on a carrier, as is conventional in these type of catalysts. Accordingly, the metallic compound may be supported on an appropriate carrier such as silica, alumina, silica/alumina, diatomaceous earth, Alundum, corundum, activated carbon, naturally occurring silicates or the like in any step of the above-mentioned processes of preparing the catalyst.

In practising the process of this invention, a stable solvent withstanding the use at the reaction temperature can be used as well as the water. The solvents usable in this invention are alcohols, ketones, amides, sulfoxides and the like, concrete examples of which include methanol, ethanol, isopropanol, acetone, dimethylformamide, dimethyl sulfoxide, formamide, acetamide and the like.

The catalyst of this invention has characteristic features of being high in activity and selectivity for the hydration reaction, long in life-time and easy to store and handle. Also the dissolved oxygen in the liquid fed to the reaction system, if it is present, exercises no adverse influence on the activity and selectivity of the catalyst. Therefore, this invention provides an excellent process for the production of acrylamide from the technical and economical points of view.

This invention will be illustrated with reference to the following examples, but the present invention is not of course limited to these examples.

EXAMPLE 1

2 Moles of titanium tetrachloride (TiCl$_4$) and 0.05 mole of zinc nitrate (Zn(NO$_3$)$_2$·6H$_2$O) were dissolved into 3 liters of water, to which was added 28% ammonia water with vigorous stirring till the pH reached 7.

The formed precipitate was filtered with suction and washed twice with 10 liters of water. The precipitate thus obtained was dried at 110° C. for 10 hours and calcined at 500° C. for 6 hours.

5 Grams of the catalyst prepared by the above-mentioned process was pulverized, placed in a flask having a capacity of 100 ml and equipped with Liebig's condenser together with 23 g of 6.8% (by weight) aqueous solution of acrylonitrile and refluxed for 5 hours at a reaction temperature of about 70° C. while stirring under atmospheric pressure.

After the reaction, the reaction mixture was filtered to remove the catalyst and the filtrate was analyzed by gas chromatography. Thus, it was confirmed that the filtrate contained 0.35 g (yield 16.7%) of acrylamide. The yeild of acrylamide as referred to herein is % by mole of the formed acrylamide based on the fed acrylonitrile.

1.2 Percent of ethylene cyanohydrin and 0.7% of acrylic acid were detected based on the formed acrylamide.

EXAMPLES 2-5

2.5 Moles of titanium tetrachloride (TiCl$_4$) were slowly dropped into 500 ml of ion-exchanged water while cooling with ice. 2.5 Moles of zinc chloride (ZnCl$_2$) were dissolved into 1 liter of ion-exchanged water.

Both solutions were introduced into a 5 liter separable flask, to which were added 1 kg of urea and 2 liters of ion-exchanged water. The temperature of the inner liquid was elevated to 92° C. with stirring, and this state was maintained for about 10 hours until the pH of the inner liquid reached 6.5. The stirring was stopped, and the reaction mixture was left standing overnight.

While filtering the resulting precipitate with suction, it was washed with a large quantity of ion-exchanged water until chlorine ion became undetectable, and dried in the air at 110° C. for 10 hours. It was pulverized into fine powder and then calcined at 500° C. for 3 hours, which was used as a catalyst.

Hydration reaction of acrylonitrile was carried out under the same reaction conditions as in Example 1, and the yield of acrylamide was 85.6%. 0.7 Percent of ethylene cyanohydrin and 0.2% of acrylic acid were detected based on the acrylamide.

Apart from above, several catalysts were also prepared by repeating the above-mentioned preparative process except that the proportion of titanium tetrachloride to zinc chloride was varied. Thereafter, hydration reaction of acrylonitrile was carried out by repeating the above-mentioned procedure. The yields of acrylamide, as well as the result obtained above, are summarized in Table 1.

TABLE 1

| Example No. | Composition of catalyst used (atomic ratio) | Yield of acrylamide (% by mole) |
|---|---|---|
| 2 | Ti—Zn (50.0/50.0) | 85.6 |
| 3 | Ti—Zn (15.0/85.0) | 11.2 |
| 4 | Ti—Zn (35.0/65.0) | 51.0 |
| 5 | Ti—Zn (65.0/35.0) | 74.3 |

EXAMPLE 6

In order to compare the homogeneous precipitation process using urea with the precipitation process using ammonia, a catalyst having the same composition as in Example 1 was prepared by the homogeneous precipitation process.

Thus, 2 moles of titanium tetrachloride and 0.05 mole of zinc nitrate were dissolved into 3 liters of water, 600 g of urea was added, and the mixture was heated with stirring at 92° C. until the pH reached 6.5. The stirring was stopped and the mixture was left standing overnight, then it was washed twice with 10 liters of water while filtering it with suction. The precipitate thus obtained was dried at 110° C. for 10 hours and calcined at 500° C. for 6 hours, and then it was used as a catalyst.

The hydration reaction of acrylonitrile was carried out under the same reaction conditions as in Example 1. The yield of acrylamide was 25.3%. 0.3 Percent of ethylene cyanohydrin and 0.2% of acrylic acid were detected based on the acrylamide.

By comparing these results with those of Example 1, it is understandable that the catalyst obtained by the homogeneous precipitation process is much improved in activity and selectivity as compared with the catalyst obtained by the ammonia precipitation process. By comparing these results with those of Example 2, it is understandable that, when the content of the second component in the catalyst is small, the selectivity is improved though the activity is low.

EXAMPLE 7-14

Catalysts having various compositions were prepared by a process of forming a precipitate with ammonia water in the same manner as in Example 1. All the metallic salts used in the preparation of catalyst were nitrates, except for the salt of titanium. All the salts of titanium used in the preparations of catalysts of Examples 8-15 were titanium tetrachloride, and the catalyst of Example 7 was prepared by a process comprising hydrolyzing titanium tetraisopropoxide in hot water at 90° C., dissolving zinc nitrate therein and adding ammonia water thereto to form a precipitate for obtaining the catalyst in the same manner as in Example 1.

The hydration reaction of acrylonitrile was carried out under the same conditions as in Example 1. The results are shown in Table 2.

TABLE 2

| Example No. | Composition of catalyst used (atomic ratio) | | Yield of acrylamide (% by mole) |
|---|---|---|---|
| 1 | Ti—Zn | (97.6/2.4) | 16.7 |
| 7 | Ti—Zn | (97.6/2.4) | 20.3 |
| 8 | Ti—Cd | (97.6/2.4) | 15.2 |
| 9 | Ti—Cu | (90.9/9.1) | 10.8 |
| 10 | Ti—Zn—Ni | (96.6/2.4/1.0) | 31.1 |
| 11 | Ti—Zn—La | (96.6/2.4/1.0) | 30.5 |
| 12 | Ti—Cd—La | (96.6/2.4/1.0) | 30.2 |
| 13 | Ti—Cu—La | (76.9/7.7/15.4) | 28.7 |
| 14 | Ti—Cu—Ni | (87.0/8.7/4.4) | 26.3 |
| 15 | Ti—Zn—La | (76.9/19.2/3.9) | 45.6 |

EXAMPLE 16

A catalyst prepared by the process of Example 2 was made into particles having a size of 30-60 mesh. 83 Grams of the catalyst was packed into a glass-made reaction tube having an inner diameter of 2 cm and a length of 50 cm and equipped with a heating jacket. An aqueous solution containing 6.5% by weight of distilled acrylonitrile was fed from the lower part of the reaction tube by the use of a plunger pump at a flow rate of 1.1 ml/minute. In the jacket, hot water at 70° C. was circulated.

The liquid reaction mixture flowing out of the upper part of the reactor was analyzed. The content of acrylamide was 3.4% by weight. The yield of acrylamide was 40.0% by mole.

When the reaction was continued for 1,600 hours under the above-mentioned reaction conditions, the yield of acrylamide reached 38.8% and the decrease in yield was slight. The selectivity was almost the same as that in Example 2, and no change with the lapse of time was found. Further, no change with the lapse of time was found in the pressure drop in the packed catalyst layer, and also when a large amount of methanol was added to the liquid reaction mixture, no noticeable white turbidity appeared, and therefore it was considered that formation of polymer did not occur. Based on the above-mentioned experiments, the catalyst according to the method of this invention is considered to have a long life-time and be satisfactorily usable from the industrial viewpoint.

What is claimed is:

1. In the method for the production of acrylamide by catalytic hydration of acrylonitrile, the improvement comprising using a compound oxide catalyst which is prepared by a precipitation process and represented by the formula, $$Ti_a X_b Y_c O_d$$

wherein Ti is titanium, X is one of zinc, cadmium and copper, Y is either nickel or lanthanum and the atomic ratios a, b and c are 15 to 98, 2 to 85 and 0 to 20, respectively and d is the number of oxyten atoms satisfying the valence of the other elements.

2. A method according to claim 1, wherein X is zinc and the atomic ratio c is 0.

3. A method according to claim 2, wherein the atomic ratios a and b are 30 to 70 and 70 to 30, respectively.

4. A method according to claim 1, wherein the atomic ratios a, b and c are 15 to 98, 2 to 85 and 1 to 10, respectively.

5. A method according to claim 1, wherein the compound oxide catalyst is prepared by the homogenous precipitation process using urea.

* * * * *